(12) United States Patent
Gill

(10) Patent No.: US 10,087,004 B2
(45) Date of Patent: Oct. 2, 2018

(54) MATERIAL HANDLING HOPPER

(71) Applicant: David R. Gill, Easton, PA (US)

(72) Inventor: David R. Gill, Easton, PA (US)

( * ) Notice: Subject to any disclaimer, the term of this patent is extended or adjusted under 35 U.S.C. 154(b) by 0 days.

(21) Appl. No.: 15/586,611

(22) Filed: May 4, 2017

(65) Prior Publication Data
US 2017/0320668 A1    Nov. 9, 2017

Related U.S. Application Data

(60) Provisional application No. 62/331,621, filed on May 4, 2016.

(51) Int. Cl.
  *B65G 11/02*    (2006.01)
  *B65G 11/20*    (2006.01)
(52) U.S. Cl.
  CPC .......... *B65G 11/02* (2013.01); *B65G 11/206* (2013.01); *B65G 11/026* (2013.01)
(58) Field of Classification Search
  CPC ... B65G 11/026; B65G 11/083; B65G 11/166; B65G 11/186; B65G 11/02; B65G 11/206; B65G 11/00
  USPC ................................. 193/2 R, 3, 4
  See application file for complete search history.

(56) References Cited

U.S. PATENT DOCUMENTS

| | | | |
|---|---|---|---|
| 2,641,384 A | 6/1953 | Mateer | |
| 2,868,357 A | 1/1959 | Thomas | |
| 3,071,297 A | 1/1963 | Lee | |
| 3,460,659 A * | 8/1969 | Gooding | B65D 88/54 193/3 |
| 4,282,988 A * | 8/1981 | Hulbert, Jr. | B65D 88/28 222/184 |
| 4,398,653 A | 8/1983 | Daloisio | |
| 4,477,029 A * | 10/1984 | Green | B02C 18/12 241/101.78 |
| 5,322,096 A | 6/1994 | Tetenborg et al. | |
| 6,074,135 A * | 6/2000 | Tapphorn | B05B 5/047 406/134 |
| 6,588,459 B2 | 7/2003 | O'Connell | |
| 6,739,524 B2 | 5/2004 | Taylor-McCune et al. | |
| 6,971,495 B2 * | 12/2005 | Hedrick | B65D 88/28 193/2 R |

(Continued)

FOREIGN PATENT DOCUMENTS

| CN | 201712983 | 1/2011 |
|---|---|---|
| DE | 102010016634 | 10/2011 |

(Continued)

OTHER PUBLICATIONS

Frain Industries. Azo Hooper AS-150 Dairy Valve [online]. Apr. 9, 2016 [retrieved on Jul. 17, 2017]. Retrieved from the Internet: <https://web.archive.org/web/20160409103052/https://www.fraingroup.com/products/axo-hopper-as-150-dairy-valve/>.

*Primary Examiner* — James R Bidwell
(74) *Attorney, Agent, or Firm* — Volpe and Koenig, P.C.

(57) ABSTRACT

A material handling hopper includes an integrally formed handling body that defines an inlet, an outlet, and an axis. The handling body has a seamless sidewall extending between the inlet and the outlet. The sidewall is circular in cross section in a plane perpendicular to the axis. The sidewall is curvilinear and defines a first height between an axial location of a first inner diameter and an axial location of a second inner diameter.

18 Claims, 5 Drawing Sheets

(56) References Cited

U.S. PATENT DOCUMENTS

| | | | |
|---|---|---|---|
| 8,632,328 B2* | 1/2014 | Van Blokland | A21C 3/02 425/102 |
| 2001/0017303 A1* | 8/2001 | McKenzie | B65D 88/28 222/181.1 |
| 2004/0052590 A1 | 3/2004 | Hedrick et al. | |
| 2012/0193357 A1 | 8/2012 | Pleima | |
| 2014/0263776 A1* | 9/2014 | Bottura | B01J 2/10 241/28 |
| 2015/0314970 A1 | 11/2015 | McIlrath et al. | |

FOREIGN PATENT DOCUMENTS

| | | |
|---|---|---|
| EP | 0654422 | 5/1995 |
| EP | 1264784 | 4/2004 |

\* cited by examiner

MATERIAL HANDLING HOPPER

FIELD OF INVENTION

The present disclosure relates to a material handling hopper, and, more particularly, to a material handling hopper with a curvilinear sidewall that allows for a desirable mass flow in a compact design, and a method of manufacturing the material handling hopper.

BACKGROUND

A hopper is a material handling device that transfers flowable materials from a source, such as a conveyor, to a container or further conveyor. Hoppers generally include converging sidewalls that direct material from a large inlet to a smaller outlet. The shape of the sidewalls and characteristics of the flowable material dictate the flow through the hopper. Problematic conditions that impede the free flow of material (e.g., such as a "rathole" (an empty vertical hole from the top of the material to the outlet with side material NOT flowing at all) or a "bridge" (where the material simple sets up a self-supporting arch across the hopper and no material flows thereafter)) may occur if the hopper sidewalls are not particularly configured for transferring a selected flowable material.

One attempt to provide a material handling hopper that helps to avoid these conditions with some flowable materials is disclosed in U.S. Pat. No. 3,071,297 ("the '297 Patent"). The '297 Patent discloses a multi-part hopper with converging sidewalls that includes a large inlet component that is connected to a smaller, separate outlet component. The inlet component includes a vertical wall inlet section and an angled wall transfer section attached to the outlet component. The outlet component includes sidewalls shaped to match a section of a hyperbola. The inlet section receives flowable material which the transfer section directs to the outlet component. The outlet component directs the flowable material out of the hopper.

While the hyperbolic shape of the outlet component of the '297 Patent may help to avoid some problematic conditions, it may be less than ideal. For example, because the outlet component is configured to be used in conjunction with a large inlet component, the hopper of the '297 Patent takes up a large amount of space. Further, the outlet component itself has a relatively low volume and must be specifically shaped to fit to the transfer section of the inlet component. Moreover, the multi-part configuration of the hopper complicates the manufacturing and assembly process.

The present disclosure is directed to overcoming one or more problems of the prior art.

SUMMARY

In one aspect, the present disclosure is directed to a material handling hopper. The material handing hopper includes an integrally formed handling body defining an inlet, an outlet, and an axis. The handling body includes a sidewall configured to guide flowable material from the inlet to the outlet. The sidewall is circular in cross-section in a plane perpendicular to the axis and defines a first inner diameter at the inlet and a second inner diameter at the outlet. The sidewall is curvilinear between an axial location of the first inner diameter and an axial location of the second inner diameter in a plane parallel to the axis. The sidewall also defines a first height between the axial location of the first inner diameter and the axial location of the second inner diameter.

In another aspect, the present disclosure is directed to a material handling system. The material handling system includes a material supplier, a material receiver, and a material handling hopper configured to transfer flowable material from the material supplier to the material receiver. The material handling hopper includes a handling body defining an inlet, an outlet, and an axis. The handling body includes a sidewall configured to guide the flowable material from the inlet to the outlet. The handling body further includes a curvilinear section in which the sidewall is curvilinear and converges in a direction from the inlet to the outlet along the axis, and a linear section connected to the curvilinear section and in which the sidewall is linear. The handling body is integrally formed as one piece.

In yet another aspect, another material handling hopper is disclosed. The material handling hopper includes an integrally formed handling body defining an inlet, an outlet, and an axis, the handling body including a sidewall configured to guide flowable material from the inlet to the outlet. In addition, the sidewall is circular in cross-section in a plane perpendicular to the axis and defines a first inner diameter at the inlet, a second inner diameter at the outlet, and a minimum diameter between the first inner diameter and the second inner diameter. Further, the sidewall is curvilinear between an axial location of the first inner diameter and an axial location of the second inner diameter in a plane parallel to the axis. The sidewall converges in a direction from the inlet to the outlet axis between the inlet and the minimum diameter, and the sidewall diverges in the direction from the inlet to the outlet axis between the minimum diameter and the outlet.

In yet another aspect, the present disclosure is directed to a method of manufacturing a material handling hopper. The method includes spinning a material blank on a lathe and forming the material blank into a funnel-shape while it is spinning on the lathe to form a seamless handling body of the material handling hopper. The method also includes forming an inlet and an outlet of the material handling hopper. The handling body defines an axis extending between the inlet and the outlet and includes a sidewall. The sidewall is circular in cross-section in a plane perpendicular to the axis. In addition, the sidewall is curvilinear such that the sidewall increasingly approaches a line parallel to the axis as the sidewall extends from the inlet to the outlet.

BRIEF DESCRIPTION OF THE DRAWING(S)

The foregoing summary and the following detailed description will be better understood when read in conjunction with the appended drawings, which illustrate disclosed embodiments of the invention. In the drawings:

FIG. 1 depicts an exemplary material handling system which includes a material handling hopper consistent with disclosed embodiments.

FIG. 2 further depicts a top view of the material handling hopper of FIG. 1.

DETAILED DESCRIPTION OF THE PREFERRED EMBODIMENT(S)

Figure 1:
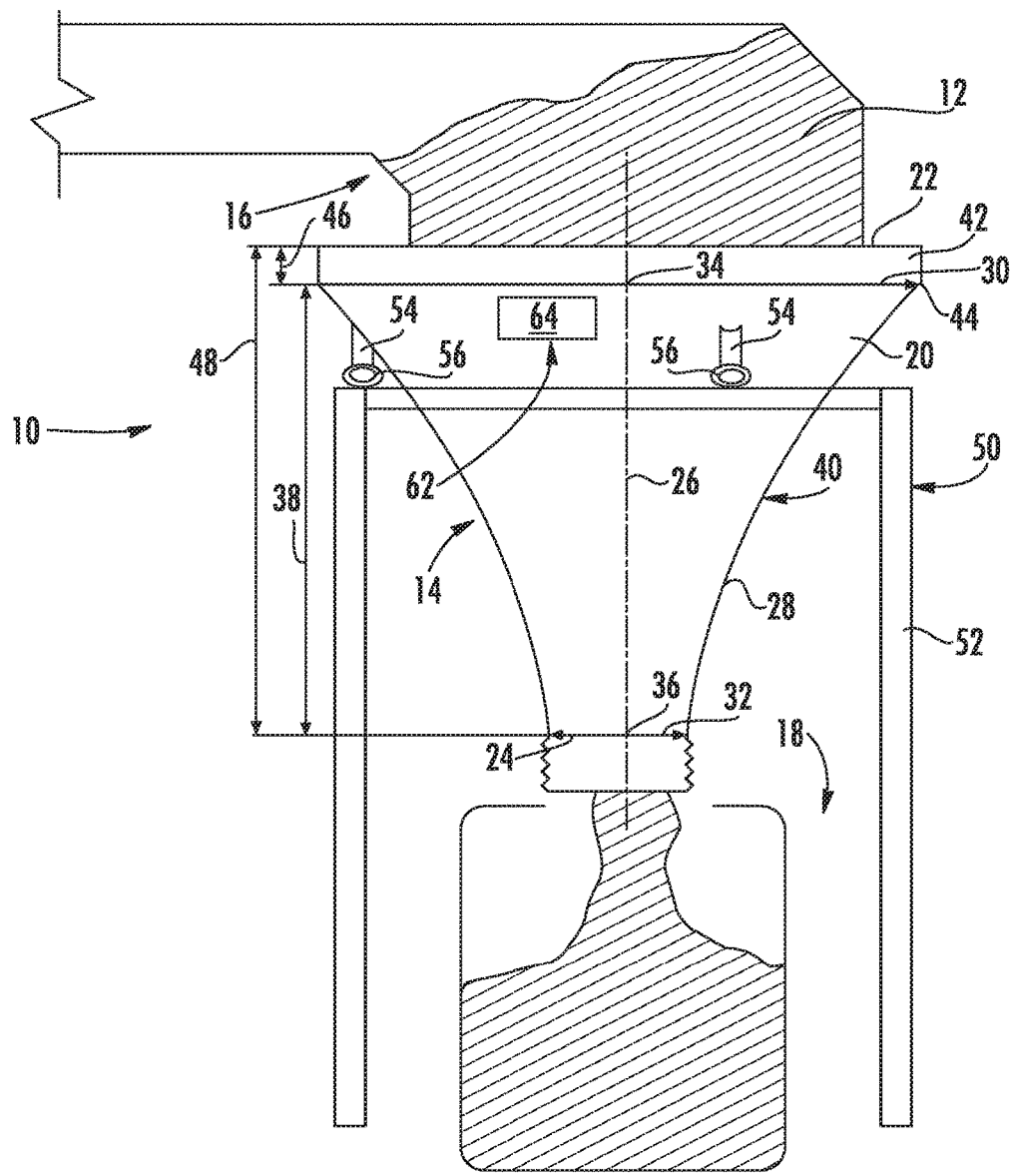

FIG. 1 illustrates a material handling system 10 for transferring a material 12 between different conveyors, containers, vessels, or machines. The material 12 is a flowable bulk material, which may be any of a variety of materials known in the material handling art. In an exemplary embodiment, the material handling system 10 includes a material handling hopper 14 configured to transfer the material 12 from a material supplier 16, such as a tubular conveyor, to a material receiver 18.

The hopper 14 includes a handling body 20 which defines an inlet 22 for receiving the material 12 from the material supplier 16 and an outlet 24 for expelling the material 12 to the material receiver 18. The handling body 20 further defines an axis 26 extending between the inlet 22 and the outlet 24 and which may be generally perpendicular to a plane defined by at least one of the inlet 22 and the outlet 24.

The handling body 20 includes a sidewall 28 which defines an interior and an exterior of the hopper 14. The sidewall 28 is circular in cross-section in a plane perpendicular to the axis 26 (see FIG. 2) and defines a first inner diameter 30 at the inlet 22 and a second inner diameter 32 at the outlet 24. The sidewall 28 is curvilinear. The sidewall 28 is curvilinear between an axial location 34 of the first inner diameter 30 and an axial location 36 of the second inner diameter 32. Due to the curvilinear shape, the sidewall 28 converges in a direction from the inlet 22 to the outlet 24 along the axis 26. In this way, the sidewall 28 is configured to guide material 12 from the inlet 22 to the outlet 24.

The sidewall 28 defines a first height 38 between the axial location 34 of the first inner diameter 30 and the axial location 36 of the second inner diameter 32. The first height 38 corresponds to a curvilinear section 40 of the hopper 14. In some embodiments, the hopper 14 may only include the curvilinear section 40. For example, the sidewall 28 may be curvilinear between top and bottom edges of the handling body 20.

As shown in FIG. 1, the sidewall 28 in the curvilinear section 40 increasingly approaches a line parallel to the axis 26 as the sidewall 28 extends from the inlet 22 to the outlet 24. The hopper 14 is thus funnel-shaped (which may also be called a horn cone). This shape provides the hopper 14 with several desirable qualities. For example, this shape allows the sidewall 28 to provide shallow slope angles near the inlet 22 and steep slope angles near the outlet 24. The shallow slope angles near the inlet 22 increase a volume of the interior of the handling body 20 while the steep slope angles near the outlet 24 promote free flow of material (e.g., by helping to avoid problematic conditions that inhibit flow, such as ratholes and bridges). Thus, the hopper 14 provides for a desired mass flow in a compact design.

The handling body 20 may include certain geometrical relationships in order to provide a hopper 14 consistent with the disclosed embodiments. For example, in order to achieve a desired mass flow in a compact design, the handling body 20 may be configured such that the first inner diameter 30 is greater than the first height 38 and a ratio of the first inner diameter 30 to the second inner diameter 32 is at least 4:1.

In some embodiments, such as the embodiment shown in FIG. 1, the hopper 14 may further include a linear section 42. The linear section 42 is a section of the handling body 20 in which the sidewall 28 is linear. The linear section 42 may be included to increase a volume of the interior of the handling body 20. In one example, the linear section 42 is cylindrical such that the sidewall 28 is parallel to the axis 26. In another example, the linear section 42 may be angled with respect to the axis 26, such as to further increase a volume of an interior of the handling body 20.

The linear section 42 is connected to the curvilinear section 40 at an interface 44. The first inner diameter 30 is defined at the interface 44 such that the first height 38 remains a height associated with the curvilinear section 40. The linear section 42 defines a second height 46. An overall height 48 of the handling body 20 is equal to the sum of the first height 38 and the second height 46. In order to maintain a compact design even with the linear section 42, the handling body 20 may be configured such that the first inner diameter 30 is greater than the overall height 48.

The second height 46 may depend on the degree of curvature of the sidewall 28 in the curvilinear section 40. In some embodiments, the second height 46 may be between approximately 0-15% of the overall height 48. In other embodiments, second height 46 may be between approximately 15-30% of the overall height 48. Exemplary embodiments that fall within these ranges are described in more detail below.

In some embodiments, the hopper 14 is supported between the material supplier 16 and the material receiver 18 by a support system 50. The support system 50 includes, for example, a support frame 52 and a plurality of support legs 54 attached to the handling body 20 and supported by the support frame 52. The support legs 54 are attached to an exterior surface of the sidewall 28 between the axial location 34 of the first inner diameter 30 and the axial location 36 of the second inner diameter 32.

Material handling system 10 may further include an apparatus or element configured to promote the free flow of material through the hopper 14 via mechanical action. For example, the material handling system 10 may include an agitation mechanism 62 configured to vibrate the hopper 14 and/or the material 12 within the hopper 14 to inhibit the stalling or slowing of material flow. In one exemplary embodiment, the plurality of support legs 54 may include rubber support elements 56 which act as isolating elements for the hopper 14. A vibrating element 64 is then connected to the hopper 14. The vibrating element 64 may include any device configured to impart a vibrational force on the hopper 14, such as an electric, hydraulic, pneumatic, or ultrasonic device. For example a reciprocating, pressurized air driven piston vibrator can be used.

Figure 2:
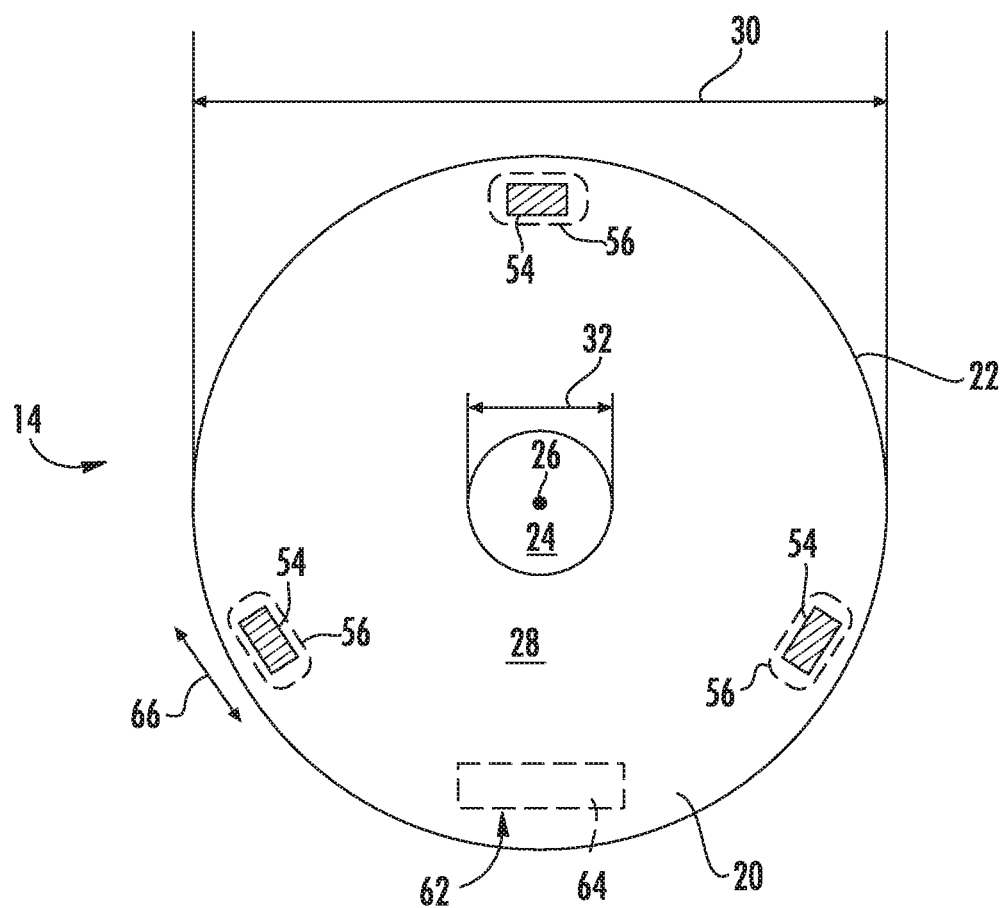

FIG. 2 depicts a top-view illustration of the hopper 14. The first inner diameter 30 is concentric with the second inner diameter 32 around the axis 26. As described above, the ratio of the first inner diameter 30 to the second inner diameter 32 is at least 4:1, In some embodiments, the ratio of the first inner diameter 30 to the second inner diameter 32 is at least 5:1.

As further shown in FIG. 2, the support legs 54 are circumferentially spaced around the handling body 20. In an exemplary embodiment, three support legs 54 are circumferentially spaced 120° from each other, although other configurations are possible.

FIG. 2 also depicts a top view of the agitation mechanism 62, including the vibrating element 64. As shown, the vibrating element 64 may be positioned to impart a reciprocating force on the hopper 14 in a direction 66. In an exemplary embodiment, the direction 66 may be a tangential direction (e.g., in relation to an outer edge of the handling body 20) such that the vibrating element 64 imparts a circumferential vibrating force on the handling body 20. The circumferential vibrating force may cause the handling body 20 to rotate in a vibrating fashion relative to the axis 26, thereby loosening stagnant material inside the handling body 20 and promoting efficient flow through the hopper 14. Alternatively, the vibrating force could be imparted in a vertical direction, in a horizontal direction (i.e., from an outer edge toward a center of the hopper 14), or any combination of these directions.

Figure 3:
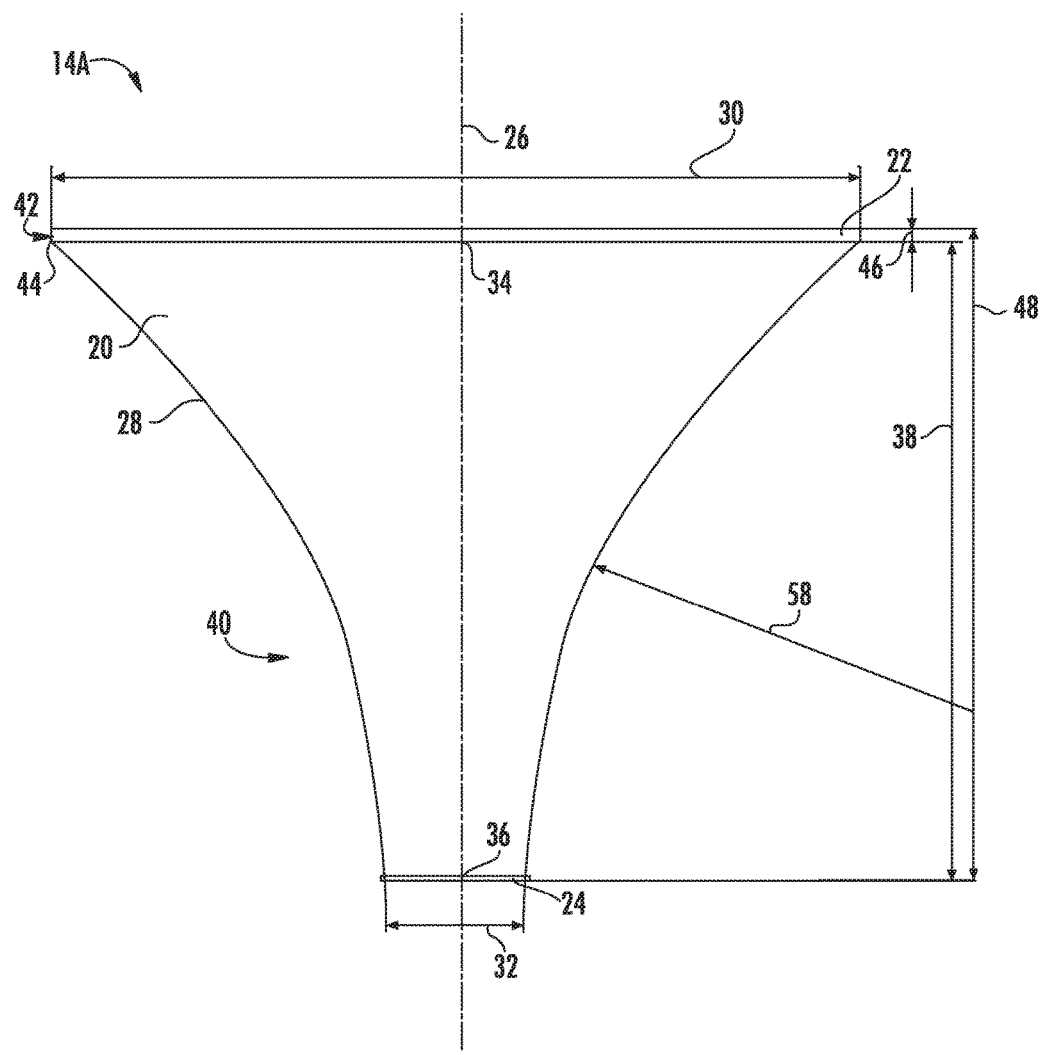
FIG. 3 depicts a side view of the material handling hopper of FIG. 1, according to a first embodiment.
Figure 4:
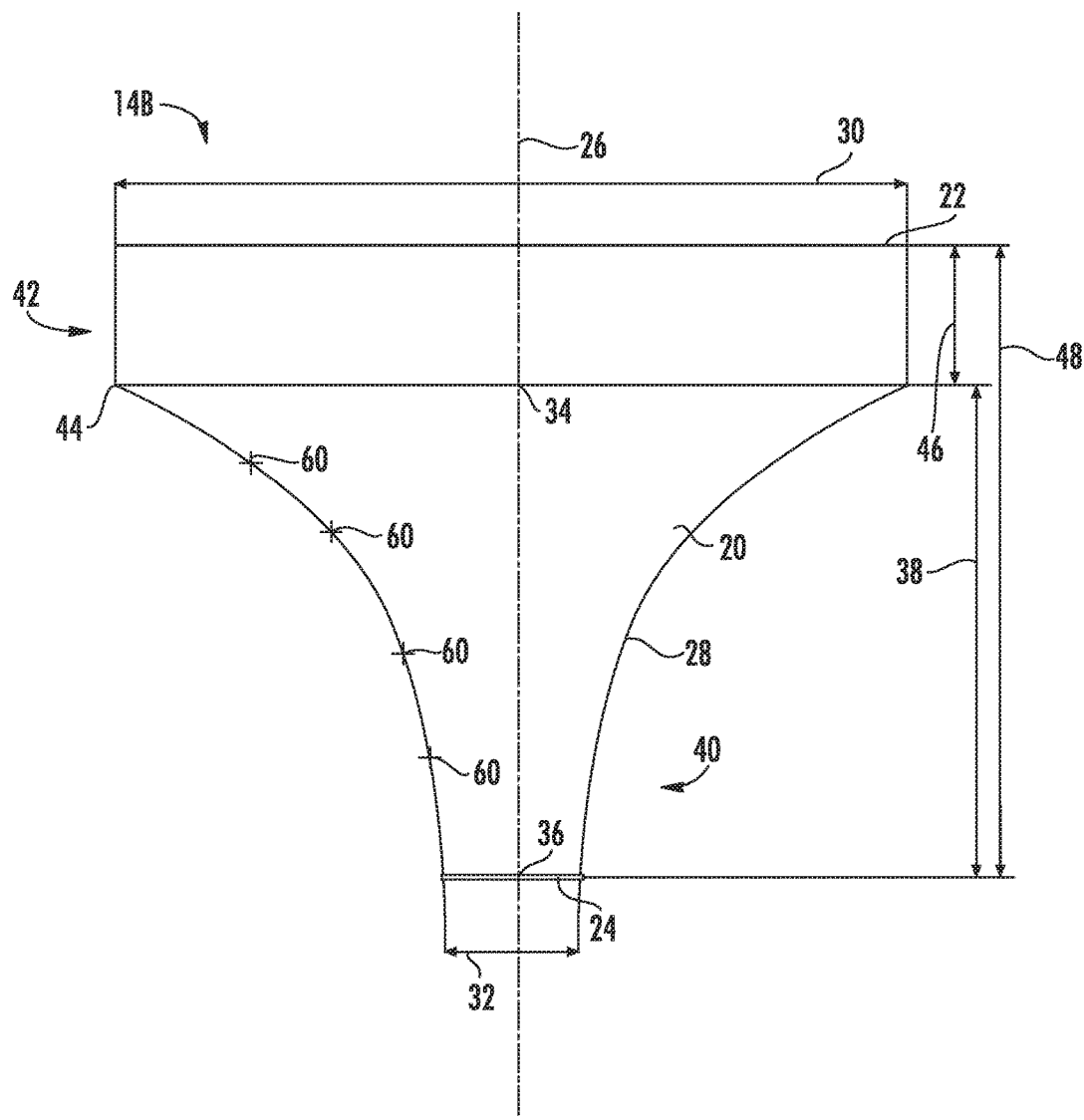
FIG. 4 depicts a side view of the material handling hopper of FIG. 1, according to a second embodiment.
Figure 5:
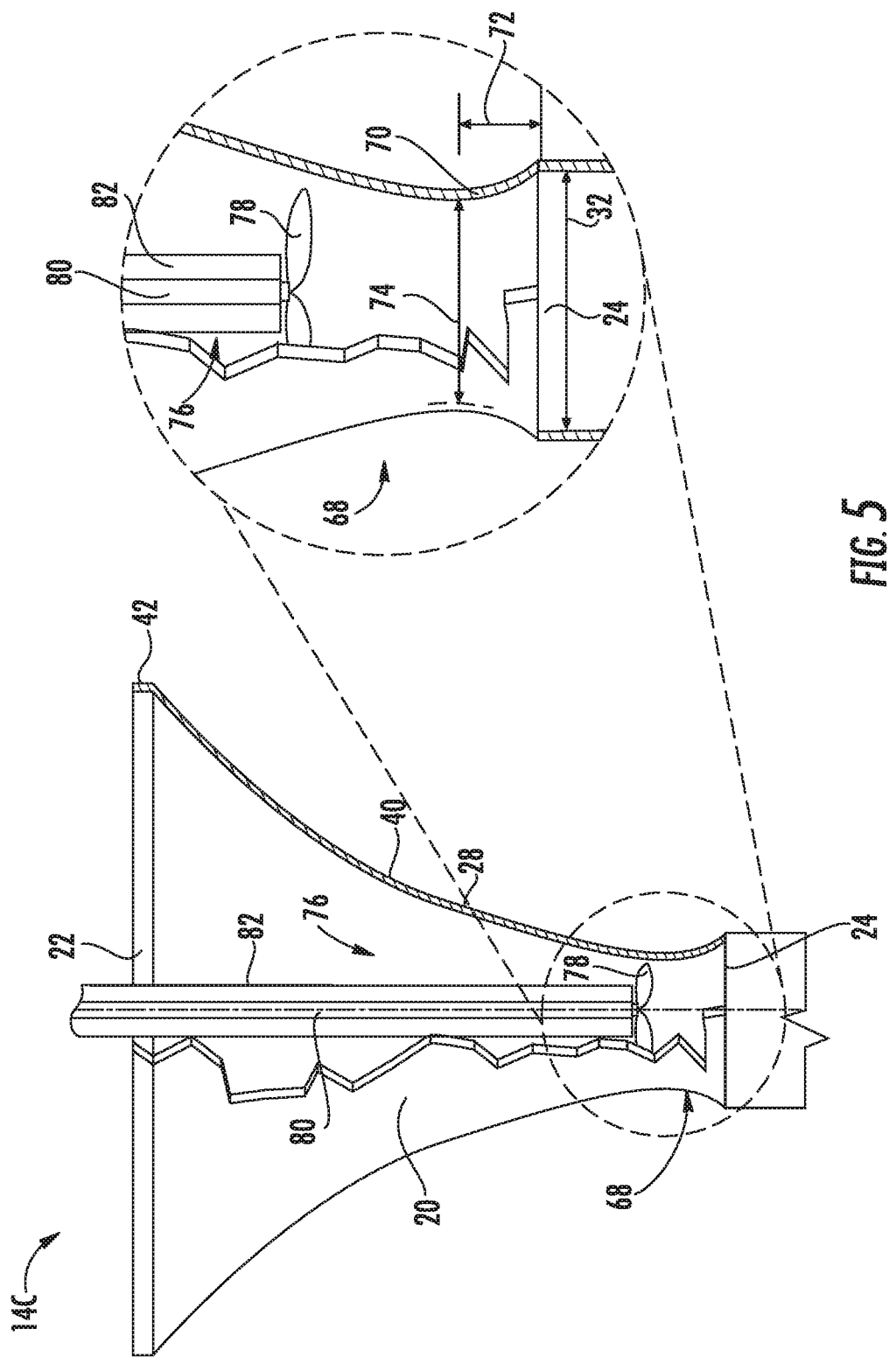
FIG. 5 depicts a side view, partially in cross-section, of the material handling hopper of FIG. 1, according to a third embodiment.

FIGS. 3-5 depict side views of hoppers 14A, 14B, and 14C, respectively, which are first, second, and third embodiments of the hopper 14. The handling body 20 of each hopper 14A, 14B includes the curvilinear section 40 and the linear section 42, although it should be understood that the linear section 42 is optional. Each sidewall 28 in the curvilinear section 40 increasingly approaches a line parallel to the axis 26 as the sidewall 28 extends from the inlet 22 to the outlet 24. In the embodiment of FIGS. 3 and 4, the curvilinear sections 40 of hoppers 14A and 14B stop at the outlet 24 before reaching the line parallel to the axis 26 or transition into a straight section with walls parallel to the axis 26. In the embodiment of FIG. 5, which is partially in cross-section, the curvilinear section 40 continues past the line parallel to the axis 26 and begins to diverge before reaching the outlet 24.

In the embodiment of FIG. 3, the sidewall 28 in the curvilinear section 40 is defined by a constant radius 58. In other words, the sidewall 28 follows a segment of a circle of radius 58 positioned adjacent to an exterior surface of the sidewall 28. This configuration results in the interior of the handling body 20 including a gradual reduction in inner diameter. In this embodiment, the linear section 42 is thereby relatively small, defining a second height 46 that is between approximately 0-15% of the overall height 48.

In the embodiment of FIG. 4, the sidewall 28 in the curvilinear section 40 is defined by an irregular radius. In other words, the sidewall 28 follows a curvilinear path that is defined by a plurality of tangent points 60, each corresponding to a tangent point of a circles having different radii positioned adjacent to the exterior surface of the sidewall 28. In the embodiment of FIG. 4, this configuration results in the interior of the handling body 20 including a steep reduction in inner diameter. In this embodiment, the linear section 42 is thereby relatively large, defining a second height 46 that is between approximately 15-30% of the overall height 48.

In the embodiment of FIG. 5, the curvilinear section 40 includes an alternative outlet portion 68. As discussed above, the outlet portion 68 is a section of the handling body 20 in which the sidewall 28 continues past a line parallel to the axis 26 and begins to diverge before reaching the outlet 24. As shown in FIG. 5, the outlet portion 68 is defined as an inversion section 70 defined by a height 72 formed between the second inner diameter 32 at the outlet 24 and a minimum diameter 74 formed at the point of the handling body 20 in which the sidewall 28 begins to diverge as it extends downwardly. As with the hoppers 14A and 14B, the sidewall 28 of hopper 14C may be defined by a constant radius between the first inner diameter 30 and the second inner diameter 32 (including the inversion section 70). Alternatively, the sidewall 28 of hopper 14C may be defined by an irregular radius between the first inner diameter 30 and the second inner diameter 32 (including the inversion section 70).

In an exemplary embodiment, the outlet portion 68, by diverging near the outlet 24, helps to reduce a pressure between the material 12 and the sidewall 28 as the material 24 reaches the outlet 24. This area of low pressure formed at the outlet portion 68 would aid in pulling material near the axis 26 (e.g., center of handling body 20) downwardly, thereby enhancing the flow of material 12 and helping to prevent flow blockage near the outlet 24.

FIG. 5 further depicts an optional feature of a flow promoter 76 in the form of one or more vanes 78 positioned on a shaft 80. The shaft 80 is positioned in a stationary tube 82. The shaft 80 is configured to rotate the propeller 78 to further promote flow near the outlet 24. For example, vanes 78 may be angled to create a downward force on the material 12. The vanes may be formed from round or flat bar stock, or a spring steel to allow the vanes to flex as they create the downward force. The vanes 78 may be operated at a high speed (e.g., 360 RPM or greater) and may be selectively controlled to customize a flow rate at the outlet 24. This flow promoter 76 can also be used in connection with the other embodiments described above.

While the outlet portion 68 and flow promoter 76 are depicted and described in relation to the embodiment shown in FIG. 5, it should be understood that these features may be applied to any embodiment of hopper 14 consistent with the disclosure. Additional features that may be applied to one or more embodiments include the use of a material coating (e.g., plastic) or smooth surface finish (e.g., via polishing) that reduces surface friction, and a bowl-shaped charging adapter with sloping-side walls that is connectable to the outlet portion 68 of the hopper 14C.

Each of the depicted embodiments of hopper 14 include the geometrical relationships described herein that produce a desired mass flow in a compact design. For example, in both hoppers 14A and 14B, the first inner diameter 30 is greater than the first height 38 and a ratio of the first inner diameter 30 to the second inner diameter 32 is at least 4:1. In hopper 14C, a ratio of the first inner diameter 30 to the minimum diameter 74 may also be at least 4:1.

Additional advantages of the shape of hopper 14 may be realized in the ease of manufacturing and assembly. For example, in some embodiments, the handling body 20 of hopper 14 is manufactured such that it is integrally formed as one seamless piece. The handling body 20 may be formed from a single piece of material, such as stainless steel or aluminum. A performance coating or liner may be added to enhance material flow (e.g., reduce friction at the interior surface of the sidewall 28).

In an exemplary embodiment, the hopper 14 is manufactured using a spinning process on a lathe. The process includes spinning a material blank on the lathe and pressing the spinning blank to form a seamless funnel-shape. The process includes gradual pressing of the material at different axial locations and/or forming the material blank over a pattern to produce a sidewall 28 with a curvilinear shape. In this way, a curvilinear section 40 having the geometrical relationships disclosed herein may be formed. The process may also include forming the linear section 42.

The process further includes forming the inlet 22 and the outlet 24. For example, the inlet 22 may be formed through the spinning process as the material blank is pressed while it is spinning and the outlet 24 may be cut or punched through a portion of the material blank that remains after the spinning process.

The spinning process is a cost effective method for producing the disclosed hopper 14. Moreover, producing the hopper 14 from a material blank through spinning results in a hopper body 20 that does not include any corners or seams. Alternatively, the hopper 14 could be die-cast, molded, vacuum-formed, or hydro-formed without seams. The hopper 14 can also be formed from stainless steel, aluminum, other metallic materials, or polymeric materials, such as HDPE, which provides a low-friction interior surface without seams. Thus, the interior surface of the hopper 14 is free of crevices that may be present in hoppers that are formed with welded joints. These crevices may be collection areas where material may become lodged, leading to disrupted flow and/or the possibility of bacteria growth. The presently-disclosed hopper 14 obviates this issue and additionally provides for a desired mass flow for materials that are not necessarily free-flowing. A desired mass-flow describes the action of all the material moving downward in the hopper together. In perfect mass flow, a generally level and flat surface at the top of the material in the hopper 14 would remain generally level and flat as the material lowers. For this to occur, the material must constantly accelerate faster than the material above it at all levels. While perfect mass flow is not common for powdered and granular bulk materials, anything similar is preferred where generally no material accelerates past any other, which can cause separations/stratifications based on particle size, shape, or mass. In contrast, a typical "funnel-flow" has a central flow column that goes down first from the top to the bottom, followed by the material between that central column and the side walls. This type of flow is fairly common in the bulk material handling industry; however, it is subject to many failures in flow, such as the previously noted rat-holing and bridging. The interior surface of the hopper can also be polished or an optional anti-friction coating can be applied, such as PTFE or UHMW PE, to reduce any frictional resistance between the material and the vessel walls.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein.

The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A material handling hopper, comprising:
   a handing body defining an inlet, an outlet, and an axis, the handing body including a sidewall configured to guide flowable material from the inlet to the outlet,
   wherein the sidewall is circular in cross-section in a plane perpendicular to the axis and defines a first inner diameter proximate to the inlet and a second inner diameter at the outlet,
   the sidewall is curvilinear between an axial location of the first inner diameter and an axial location of the second inner diameter in a plane parallel to the axis,
   the sidewall is linear between an axial location of the inlet and the axial location of the first inner diameter in the plane parallel to the axis,
   the sidewall defines a first height between the axial location of the first inner diameter and the axial location of the second inner diameter, a second height between the axial location of the inlet and the axial location of the first inner diameter, and an overall height of the handing body equal to the sum of the first height and the second height,
   wherein the handling body includes a curvilinear section defined by the first height and a linear section defined by the second height, and
   wherein the second height is between 15-30% of the overall height.

2. The material handing hopper of claim 1, wherein the first inner diameter is greater than the first height and a ratio of the first inner diameter to the second inner diameter is at least 4:1.

3. The material handing hopper of claim 1, wherein the sidewall between the first inner diameter and the second inner diameter is defined by a constant radius.

4. The material handing hopper of claim 1, wherein the sidewall between the first inner diameter and the second inner diameter is defined by an irregular radius.

5. The material handing hopper of claim 1, wherein the first inner diameter is defined at an interface between the linear section and the curvilinear section.

6. The material handing hopper of claim 1, wherein the handling body is integrally formed as one piece.

7. The material handing hopper of claim 1, wherein the sidewall in the curvilinear section is defined by a constant radius.

8. The material handing hopper of claim 1, wherein the sidewall in the curvilinear section is defined by an irregular radius.

9. The material handing hopper of claim 1, wherein the first inner diameter is greater than the overall height of the handling body.

10. The material handing hopper of claim 1, further including:
    a plurality of support elements attached to an exterior surface of the sidewall, and
    an agitation mechanism including a vibrating element configured to impart a force on the hopper in order to cause the hopper to vibrate,
    wherein the plurality of support elements provide vibrational isolation of the hopper.

11. The material handing hopper of claim 10, further including: a rotatable shaft with at least one vane connected thereto that extends into the hopper.

12. A material handling system, comprising:
    a material supplier;
    a material receiver;
    a material handling hopper configured to transfer flowable material from the material supplier to the material receiver, the material handling hopper comprising:
       a handling body defining an inlet, an outlet, and an axis, the handling body including a sidewall configured to guide the flowable material from the inlet to the outlet,
       wherein the handling body includes:
          a curvilinear section in which the sidewall is curvilinear and converges in a direction from the inlet to the outlet along the axis; and
          a linear section connected to the curvilinear section at an interface and in which the sidewall is linear, and
       wherein the handling body is one piece; and
    an agitation mechanism including a vibrating element configured to impart a force on the hopper in order to cause the hopper to vibrate, the force imparted in a circumferential direction relative to the sidewall.

13. The material handling system of claim 12, wherein the sidewall in the curvilinear section increasingly approaches a line parallel to the axis as the sidewall extends from the inlet to the outlet.

14. The material handling system of claim 13, wherein the sidewall in the curvilinear section is defined by a constant radius.

15. The material handling system of claim 13, wherein the sidewall in the curvilinear section is defined by an irregular radius.

16. A material handling hopper, comprising:
an handling body defining an inlet, an outlet, and an axis, the handling body including a sidewall configured to guide flowable material from the inlet to the outlet,
wherein the sidewall is circular in cross-section in a plane perpendicular to the axis and defines a first inner diameter at the inlet, a second inner diameter at the outlet, and a minimum diameter between the first inner diameter and the second inner diameter,
the sidewall is curvilinear between an axial location of the first inner diameter and an axial location of the second inner diameter in a plane parallel to the axis,
the sidewall converges in a direction from the inlet to the outlet axis between the inlet and the minimum diameter, and
the sidewall diverges in the direction from the inlet to the outlet axis between the minimum diameter and the outlet.

17. The material handling hopper of claim 16, wherein the sidewall between the first inner diameter and the second inner diameter is defined by a constant radius.

18. The material handling hopper of claim 16, wherein the sidewall between the first inner diameter and the second inner diameter is defined by an irregular radius.

* * * * *

UNITED STATES PATENT AND TRADEMARK OFFICE
CERTIFICATE OF CORRECTION

PATENT NO. : 10,087,004 B2
APPLICATION NO. : 15/586611
DATED : October 2, 2018
INVENTOR(S) : David R. Gill Page 1 of 1

It is certified that error appears in the above-identified patent and that said Letters Patent is hereby corrected as shown below:

In the Specification

1. In Column 4, Line 50, delete "4:1, In" and insert -- 4:1. In --, therefor.

2. In Column 6, Lines 31-32, delete "4:1, In" and insert -- 4:1. In --, therefor.

In the Claims

3. In Column 7, Line 50, in Claim 1, delete "handing" and insert -- handling --, therefor.

4. In Column 7, Line 51, in Claim 1, delete "handing" and insert -- handling --, therefor.

5. In Column 8, Line 1, in Claim 1, delete "handing" and insert -- handling --, therefor.

6. In Column 8, Line 8, in Claim 2, delete "handing" and insert -- handling --, therefor.

Signed and Sealed this
Eleventh Day of December, 2018

Andrei Iancu
*Director of the United States Patent and Trademark Office*